(12) United States Patent
Reese

(10) Patent No.: US 11,570,298 B1
(45) Date of Patent: Jan. 31, 2023

(54) METHOD FOR A CELLULAR MOBILE PHONE AND A SMARTPHONE

(71) Applicant: Morris Reese, Thousand Oaks, CA (US)

(72) Inventor: Morris Reese, Thousand Oaks, CA (US)

( * ) Notice: Subject to any disclaimer, the term of this patent is extended or adjusted under 35 U.S.C. 154(b) by 0 days.

(21) Appl. No.: 17/300,722

(22) Filed: Oct. 4, 2021

(51) Int. Cl.
*H04M 3/42* (2006.01)
*H04M 1/27453* (2020.01)
*H04W 4/16* (2009.01)

(52) U.S. Cl.
CPC ... *H04M 3/42068* (2013.01); *H04M 1/27453* (2020.01); *H04W 4/16* (2013.01)

(58) Field of Classification Search
None
See application file for complete search history.

(56) References Cited

U.S. PATENT DOCUMENTS

| | | | | |
|---|---|---|---|---|
| 6,564,214 | B1 * | 5/2003 | Bhide | G06F 16/90344 |
| 9,749,468 | B1 * | 8/2017 | Allen | H04M 3/42042 |
| 10,706,843 | B1 * | 7/2020 | Elangovan | G10L 15/063 |
| 2019/0037064 | A1 * | 1/2019 | Cho | H04M 1/2746 |

* cited by examiner

*Primary Examiner* — Jinsong Hu
*Assistant Examiner* — Alexander J Yi

(57) ABSTRACT

A method is disclosed for automatically adding a received phone number and name of an incoming caller to a list of existing contact phone numbers on a smartphone of a called party. More particularly, the smartphone of the called party (1) receives the phone number and name of the incoming caller from a cell site or base station at a fixed location of a cellular carrier while the called party may or may not be engaged in an existing phone call with another party; (2) searches the list of existing contact phone numbers to find a phone number that is an exact match to the received phone number of the incoming caller; (3) determines whether an exact match to the received phone number of the incoming caller was found on the list of existing contact phone numbers; (4) automatically adds the received phone number and name of the incoming caller to the list of existing contact phone numbers after it has been determined that the received phone number of the incoming caller was not found on the list of existing contact phone numbers; (5) generates an identifier, e.g., a number, and assigns the generated identifier to the received phone number and name of the incoming caller that have been automatically added to the list of existing contact phone numbers; and (6) conventional cellular service continues after it has been determined that the received phone number of the incoming caller was found on the list of existing contact phone numbers.

6 Claims, 4 Drawing Sheets

SMARTPHONE OF THE CALLED PARTY GENERATED AN IDENTIFIER, e.g. A NUMBER AND ASSIGNS THE GENERATED NUMBER TO THE RECEIVED PHONE NUMBER AND NAME OF THE INCOMING CALLER THAT HAS BEEN AUTOMATICALLY ADDED TO THE LIST OF EXISTING CONTACT PHONE NUMBERS

CONVENTIONAL CELLULAR PHONE SERVICE PREVAILS AFTER IT HAS BEEN DETERMINED THAT THE AREA CODE ASSOCIATED WITH THE RECEIVED PHONE NUMBER OF THE INCOMING CALLER WAS FOUND ON THE LIST OF EXISTING USA TELEPHONE AREA CODES

METHOD FOR A CELLULAR MOBILE PHONE AND A SMARTPHONE

FIELD OF THE INVENTION

The present invention relates to a method for automatically adding a phone number and name of an incoming caller to a list of existing contact phone numbers on a smartphone of a called party.

BACKGROUND OF THE INVENTION

A prior art smartphone, i.e. the Apple iPhone, is a portable device that combine mobile telephone and computing functions into one unit. The Apple iPhone lets users manually add a contact through a variety of methods, including the time-saving and convenient method of turning a received call into a contact. By turning the received call into a contact, the Apple iPhone will auto-populate the phone number field with the phone number from the received call. Not only can you turn a received call into a brand new contact, but you can also manually add the received phone number to an already existing contact phone list. The iPhone operating system is an ios, a modified version of the Machintosh osx operating system used on Apple desktop and laptop computers. ios 14 is the fourteenth and current major release of the ios mobile operating system developed by Apple, Inc. for their iPhone and iPod touch lines. It was released to the public on Sep. 16, 2020.

It is therefore an object of this invention to provide a method for automatically adding a received phone number and name of an incoming caller to a list of existing contact phone numbers on a smartphone of a called party while the called party may or may not be engaged in an existing phone call with another party.

SUMMARY OF THE INVENTION

An embodiment of the present invention is when a smartphone of a called party who may or may not be engaged on an existing phone call with another party (1) receives a phone number and name of an incoming caller from a cell site or base station at a fixed location of a cellular carrier; (2) searches a list of existing contact phone numbers to find a phone number that is an exact match to the received phone number of the incoming caller; (3) determines whether a phone number has been found on the list of existing contact phone numbers that is an exact match to the received phone number of the incoming caller; (4) automatically adds the received phone number and name of the incoming caller to the list of existing contact phone numbers after it has been determined that the received phone number of the incoming caller was not found on the list of existing contact phone numbers; (5) generates an identifier, e.g., a number, and assign the generated identifier to the received phone number and name of the incoming caller that was automatically added to the list of existing contact phone numbers; and (6) continues conventional cellular service after it has been determined that an exact match to the received phone number of the incoming caller was found on the list of existing contact phone numbers.

Another embodiment of the present invention is when the smartphone of the called party (1) receives a phone number and name of an incoming caller from a cell site or base station at a fixed location of a cellular carrier; (2) searches a list of existing contact phone numbers to find a phone number that is an exact match to the received phone number of the incoming caller; (3) determines whether the received phone number of the incoming caller was found on the list of existing contact phone numbers; (4) searches a list of existing USA telephone area codes to find an area code that is an exact match to an area code associated with the received phone number of the incoming caller after it has been determined that the received phone number of the incoming caller was not found on the list of existing contact phone numbers; (5) determines whether the area code associated with the received phone number of the incoming caller was found on the list of existing USA telephone area codes; (6) automatically adds the received phone number and name of the incoming caller to the list of existing contact phone numbers after it has been determined that the area code associated with the received phone number of the incoming caller was not found on the list of existing USA telephone area codes; (7) generates an identifier, e.g. a number, and assigns the generated identifier to the received phone number and name of the incoming caller that was automatically added to the list of existing contact phone numbers; and (8) continues conventional cellular service after it has been determined that the area code associated with the received phone number of the incoming caller was found on the list of existing USA telephone area codes.

BRIEF DESCRIPTION OF THE DRAWINGS

A more complete understanding of the present invention may be obtained from the following description and accompanying drawings in which.

BRIEF DESCRIPTION OF THE PREFERRED EMBODIMENT(S)

Figure 1A:
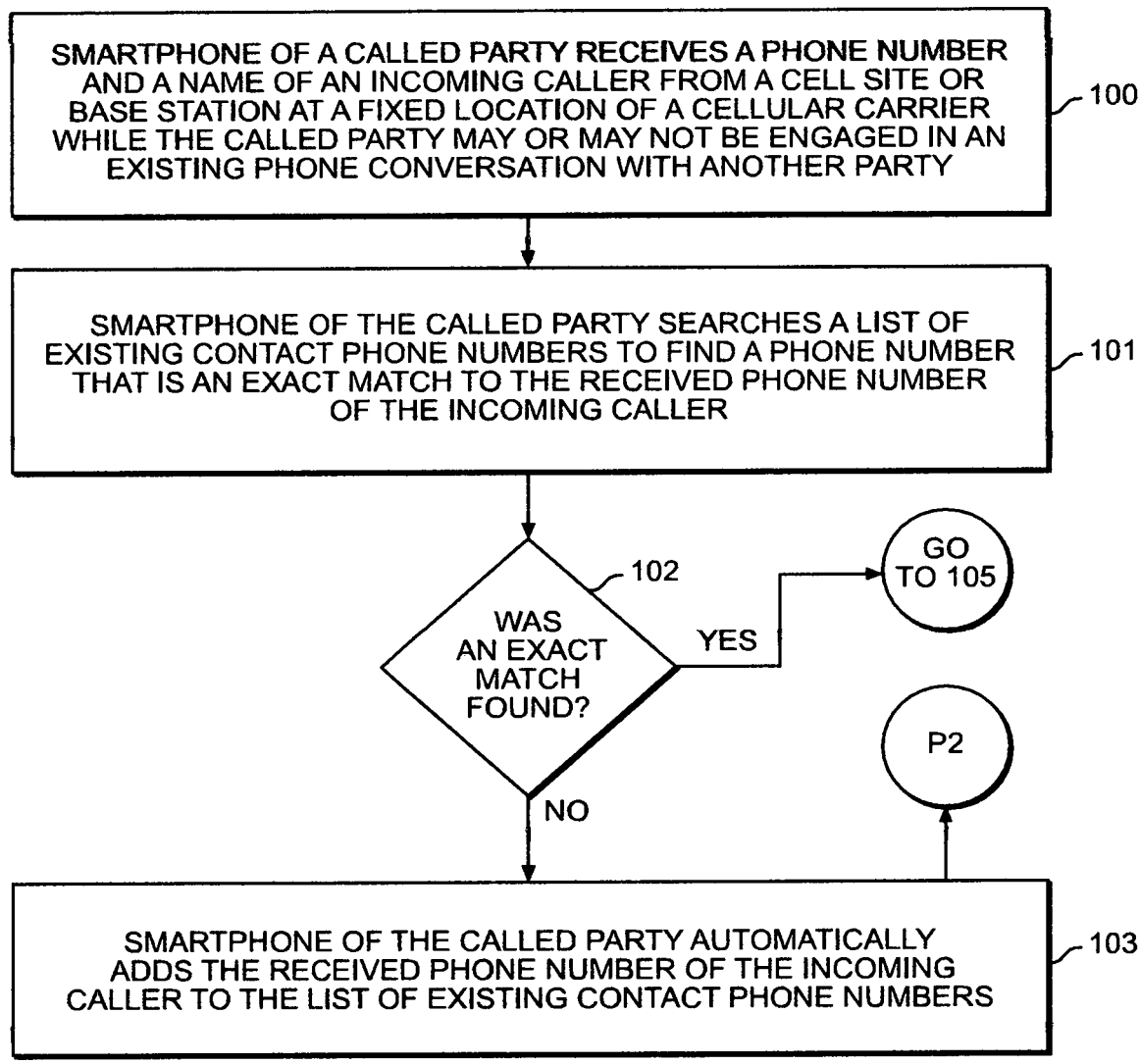
FIGS. 1a and 1b shows, in flow chart form, the sequence of an operation of the method of the invention.
Figure 1B:
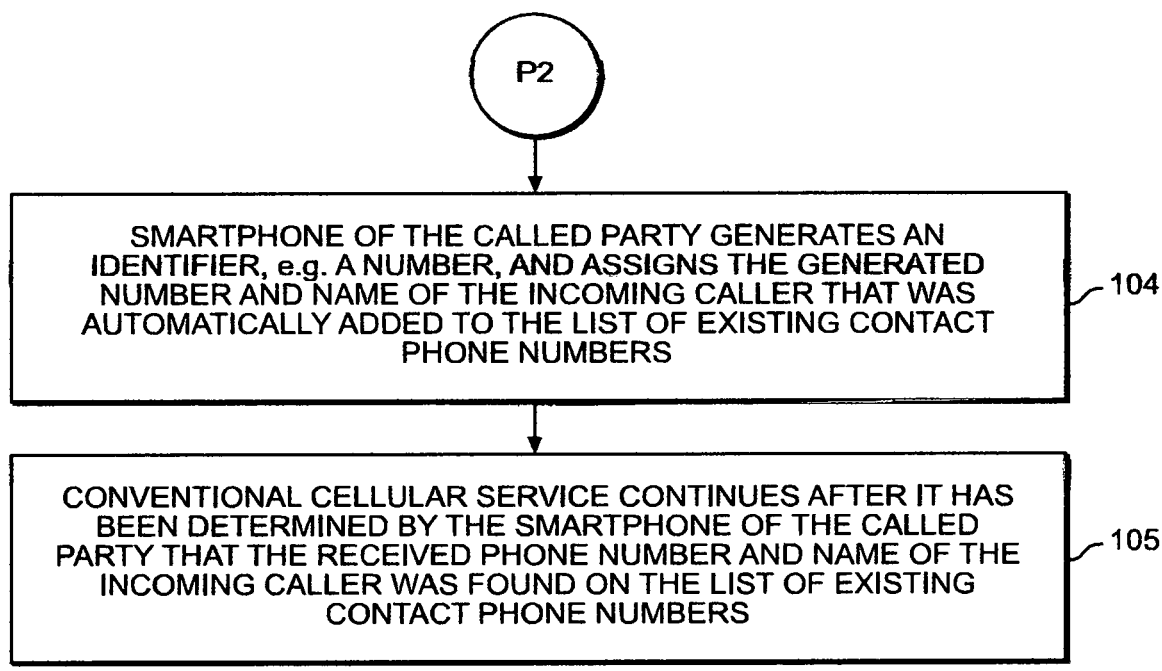

As illustrated in FIG. 1a and FIG. 1B, (step 100) the process begins when a smartphone of a called party who may or may not be engaged in an existing phone conversation with another party receives a phone number and name of an incoming caller from a cell site or base station at a fixed location of a cellular carrier.

At step 101, the smartphone of the called party searches a list of existing contact phone numbers to find a phone number that is an exact match to the received phone number of the incoming caller.

At step 102, the smartphone of the called party determines whether a phone number has been found on the list of existing contact phone numbers that is an exact match to the received phone number of the incoming caller.

At step 103, the smartphone of the called party automatically adds the received phone number and name of the incoming caller to the list of existing contact phone numbers after it has been determined that an exact match to the received phone number of the incoming caller was not found on the list of existing contact phone numbers.

At step 104, the smartphone of the called party generates an identifier, e.g. a number, and assigns the generated identifier to the received phone number and name of the incoming caller that was automatically added to the list of existing contact phone numbers.

At step 105, conventional cellular service continues after it has been determined that an exact match to the received phone number of the incoming caller was found on the list of existing contact phone numbers.

Figure 2A:
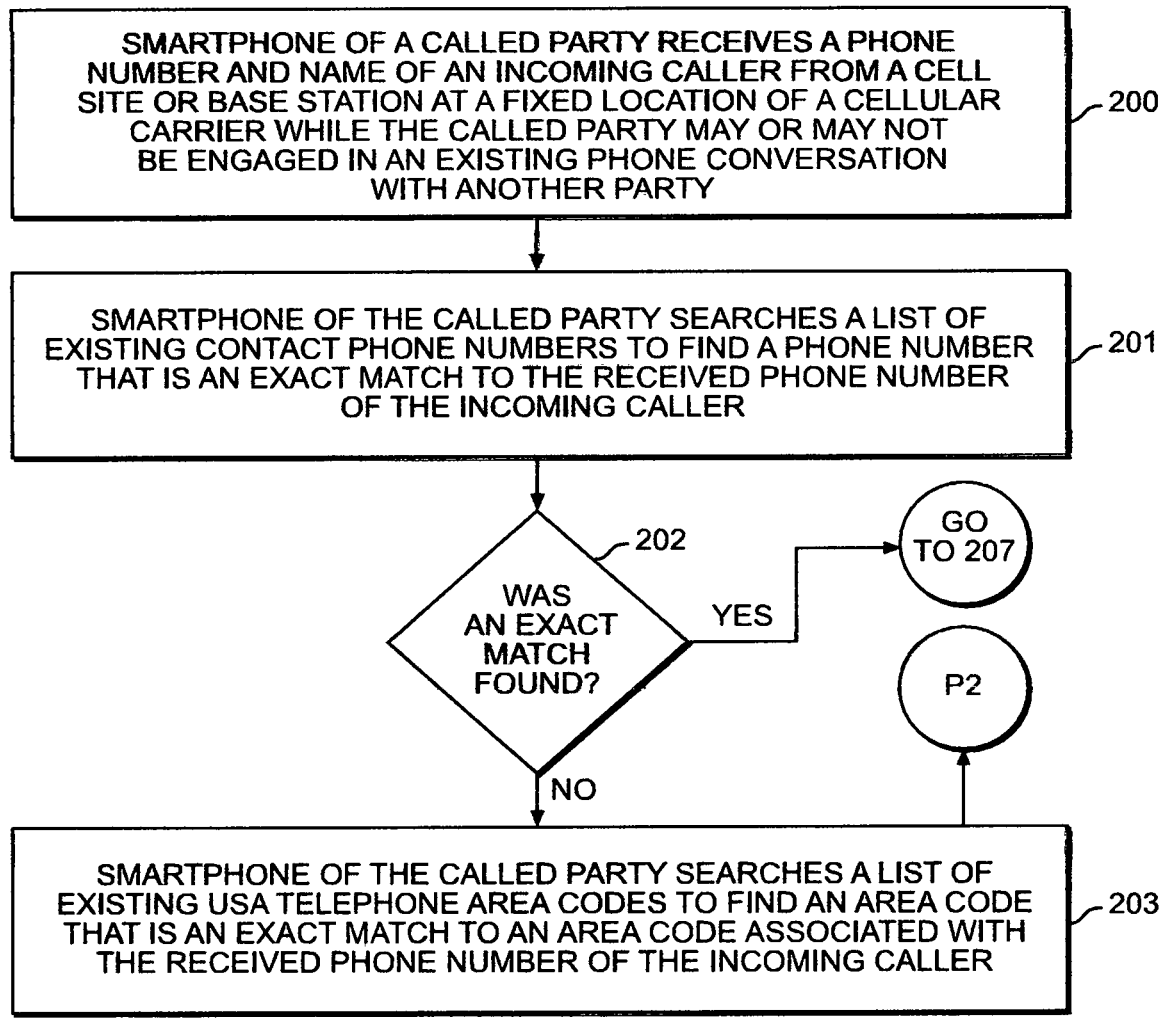
FIGS. 2a, 2b and 2c shows, in flow chart form, the sequence of another operation of the method of the invention.
Figure 2B:
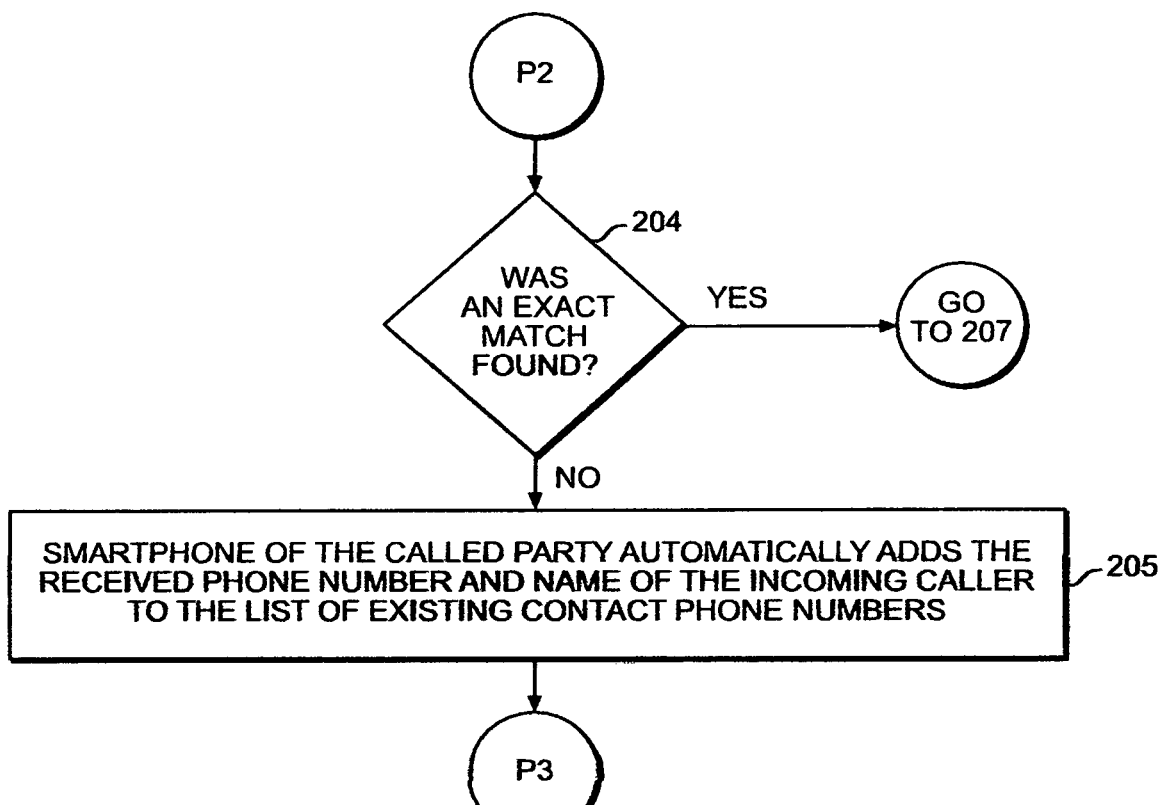
Figure 2C:
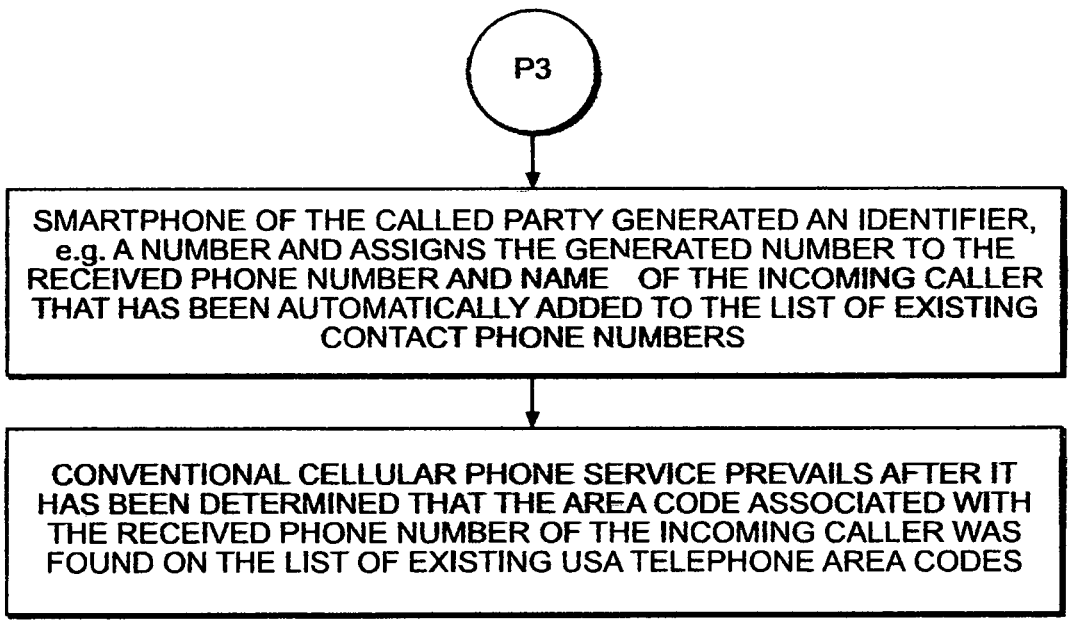

From another perspective, as illustrated in FIG. 2a, FIG. 2b and FIG. 2c, (step 200) the process begins when a smartphone of a called party who may or may not be engaged on an existing phone call with another party receives a phone number and name of an incoming caller from a cell site or base station at a fixed location of a cellular carrier.

At step 201, the smartphone of the called party searches a list of existing contact phone numbers to find a phone number that is an exact match to the received number of the incoming caller.

At step 202, the smartphone of the called party determines whether a phone number was found on the list of existing contact phone numbers that is an exact match to the received phone number of the incoming caller.

At step 203, the smartphone of the called party searches a list of existing USA telephone area codes to find an area code that is an exact match to an area code associated with the received phone number of the incoming caller after it has been determined that no phone number was found on the list of existing contact phone numbers that is an exact match to the received phone number of the incoming caller.

At step 204, the smartphone of the called party determines whether the area code associated with the received phone number of the incoming caller was found on a list of existing USA telephone area codes.

At step 205, the smartphone of the called party automatically adds the received phone number and name of the incoming caller to the list of existing contact phone numbers after it has been determined that the area code associated with the received phone number of the incoming caller was not found on the list of existing USA telephone area codes.

At step 206, the smartphone of the called party generates an identifier, e.g. a number, and assigns the generated identifier to the received phone number and name of the incoming that was automatically added to the list of existing contact phone numbers.

At step 207, conventional cellular service continues after it has been determined that the area code associated with the received phone number of the incoming caller was found on the list of existing USA telephone area codes.

What is claimed is:

1. A method for automatically adding a phone number and name of an incoming caller to a list of existing contact phone numbers on a smartphone of a called party, comprising the steps of:
   (a) receiving by the smartphone of the called party independent of being engaged in an existing phone conversation with another party, the phone number and name of the incoming caller from a cell site or base station at a fixed location of a cellular carrier;
   (b) searching by said smartphone of said called party the list of existing contact phone numbers to find a phone number that is an exact match to said received phone number of said incoming caller;
   (c) determining by said smartphone of said called party whether a phone number has been found on said list of existing contact phone numbers that is an exact match in comparison to said received phone number of said incoming caller;
   (d) continuing with conventional cellular phone service after it has been determined that an exact match to said received phone number of said incoming caller was not found on said list of existing contact phone numbers;
   (e) searching by said smartphone of said called party a list of existing USA telephone area codes comprising only a plurality of said existing USA telephone area codes to find an area code that is an exact match to an area code associated with said received phone number of said incoming caller after it has been determined that an exact match in comparison to said received phone number of said incoming caller was not found on said list of existing contact phone numbers;
   (f) determining by said smartphone of said called party whether an area code associated with said received phone number of said incoming caller was found on the list of existing USA telephone area codes as an exact match in comparison to an area code listed in said list of existing USA telephone area codes;
   (g) automatically adding said received phone number and name of said incoming caller to said list of existing contact phone numbers by said smartphone of said called party after it has been determined that the area code associated with said received phone number of said incoming caller was not found on said list of existing USA telephone area codes as not an exact match in comparison to an area code listed in said list of existing USA telephone area codes;
   (h) generating by said smartphone of said called party an identifier different from said received phone number and name of said incoming caller;
   (i) assigning said generated identifier to said received phone number and name of said incoming caller that was automatically added to said list of existing contact phone numbers; and
   (j) continuing conventional cellular service after it has been determined that the area code associated with said received phone number of said incoming caller was found on said list of existing USA telephone area codes.

2. The method of claim 1, comprising the step of:
   (h) generating by said smartphone of said called party a numerical identifier.

3. Apparatus which automatically adds a phone number and name of an incoming caller to a list of existing contact phone numbers;
   (a) receives the phone number and name of the incoming caller from a cell site or base station at a fixed location of a cellular carrier independent of the apparatus of a called party being engaged in an existing phone conversation with another party;
   (b) searches a list of existing contact phone numbers to find a phone number that is an exact match to said received phone number of said incoming caller;
   (c) determines whether a phone number has been found on the list of existing contact phone numbers that is an exact match in comparison to said received phone number of said incoming caller;
   (d) continues with conventional cellular phone service after it has been determined that an exact match to said received phone number of said incoming caller was not found on said list of existing contact phone numbers;
   (e) searches a list of existing USA telephone area codes comprising only a plurality of said existing USA telephone area codes to find an area code that is an exact match to an area code associated with said received phone number of said incoming caller after it has been determined that an exact match in comparison to said received phone number of said incoming caller was not found on said list of existing contact phone numbers;
   (f) determines whether the area code associated with said received phone number of said incoming caller was found on the list of existing USA telephone area codes as an exact match in comparison to an area code listed in said list of existing USA telephone area codes;

(g) automatically adds said received phone number and name of said incoming caller to said list of existing contact phone numbers after it has been determined that said area code associated with said received phone number of said incoming caller was not found on said list of existing USA telephone area codes as not an exact match in comparison to an area code listed in said list of existing USA telephone area codes;

(h) generates an identifier different from said received phone number and name of said incoming caller that was automatically added to said list of existing contact phone numbers;

(i) assigns said generated identifier to said received phone number and name of said incoming caller that was automatically added to said list of existing contact phone numbers; and (j) continues conventional cellular service after it has been determined that the area code associated with said received phone number of said incoming caller was found on said list of existing USA telephone area codes.

4. The apparatus in accordance with claim 3, in which said apparatus:

(h) generates a numerical identifier, and assigns said generated numerical identifier to said received phone number and name of said incoming caller that was automatically added to said list of existing contact phone numbers.

5. The apparatus in accordance with claim 3, in which said apparatus (j) continues conventional cellular phone service after it has been determined that said received phone number of said incoming caller was found on said list of existing contact phone numbers.

6. The apparatus in accordance with claim 3, wherein said apparatus is a smartphone.

* * * * *